(12) United States Patent
Condon et al.

(10) Patent No.: US 9,815,415 B2
(45) Date of Patent: Nov. 14, 2017

(54) ADJUSTABLE BICYCLE CARRIER

(71) Applicant: Yakima Products, Inc., Beaverton, OR (US)

(72) Inventors: David Condon, Beaverton, OR (US); Jason A. Sagen, Portland, OR (US); HaiTao Guo, Nanjing (CN)

(73) Assignee: Yakima Products, Inc., Lake Oswego, OR (US)

( * ) Notice: Subject to any disclaimer, the term of this patent is extended or adjusted under 35 U.S.C. 154(b) by 217 days.

(21) Appl. No.: 14/732,645

(22) Filed: Jun. 5, 2015

(65) Prior Publication Data

US 2016/0355140 A1 Dec. 8, 2016

(51) Int. Cl.

| B60R 11/00 | (2006.01) |
|---|---|
| B60R 9/00 | (2006.01) |
| B60R 9/10 | (2006.01) |
| B60R 9/06 | (2006.01) |

(52) U.S. Cl.
CPC . *B60R 9/10* (2013.01); *B60R 9/06* (2013.01)

(58) Field of Classification Search
CPC .. B60R 9/10; B60R 9/06; B60R 11/00; B60R 9/00; B60R 9/04
USPC ....... 224/504, 282, 495, 533, 500, 536, 924, 224/314
See application file for complete search history.

(56) References Cited

U.S. PATENT DOCUMENTS

| 488,395 | A | 12/1892 | Justice |
|---|---|---|---|
| 506,495 | A | 10/1893 | Hart, Jr. |
| 511,367 | A | 12/1893 | Slater |
| 529,827 | A | 11/1894 | Fonda |
| 556,789 | A | 3/1896 | Walker |
| 562,520 | A | 6/1896 | Fonda |
| 569,289 | A | 10/1896 | Lynch |
| 576,351 | A | 2/1897 | Penfield |
| 577,910 | A | 3/1897 | Bierbach |
| 580,032 | A | 4/1897 | Bierbach |
| 586,681 | A | 7/1897 | Douglas |
| 607,024 | A | 7/1898 | Durfee et al. |
| 614,264 | A | 11/1898 | Fletcher |
| 623,807 | A | 4/1899 | Myers |
| 639,765 | A | 12/1899 | Phipps |
| 1,179,823 | A | 4/1916 | Greene |
| 1,666,568 | A | 4/1928 | Jackson |
| 2,512,267 | A | 6/1950 | Donnelley |
| 2,573,187 | A | 10/1951 | Désilets |
| 3,092,362 | A | 6/1963 | Walsh |
| 3,161,973 | A | 12/1964 | Hastings |
| 3,232,502 | A | 2/1966 | Kleinbortas |

(Continued)

FOREIGN PATENT DOCUMENTS

| CA | 2198294 A1 | 8/1997 |
|---|---|---|
| CH | 308725 A | 7/1955 |

(Continued)

*Primary Examiner* — Brian D Nash

(74) *Attorney, Agent, or Firm* — Kolisch Hartwell, P.C.

(57) ABSTRACT

An adjustable bicycle carrier may include a frame and a hub assembly. One or more limb members may be rotatably attached to the hub assembly. Each limb member may be selectively locked in position by a rotatable release mechanism having an axially-translating lock portion. The frame may define a continuous, closed perimeter. The hub assembly may be connected across the frame between upper and lower end portions of the frame.

17 Claims, 10 Drawing Sheets

(56) References Cited

U.S. PATENT DOCUMENTS

| | | |
|---|---|---|
| 3,710,999 A | 1/1973 | Allen |
| 3,744,689 A | 7/1973 | Kjensmo |
| 3,765,581 A | 10/1973 | Kosecoff |
| 3,844,517 A | 10/1974 | Fraser |
| 3,872,972 A | 3/1975 | Cummins et al. |
| 3,921,869 A | 11/1975 | Rogers |
| 3,927,810 A | 12/1975 | Danon |
| 3,927,811 A | 12/1975 | Nussbaum |
| 4,085,874 A | 4/1978 | Graber |
| 4,089,448 A | 5/1978 | Traeger |
| 4,109,839 A | 8/1978 | Allen |
| 4,116,341 A | 9/1978 | Hebda |
| RE29,840 E | 11/1978 | Wasserman |
| 4,171,077 A | 10/1979 | Richard, Jr. |
| 4,182,467 A | 1/1980 | Graber |
| 4,213,729 A | 7/1980 | Cowles et al. |
| 4,265,382 A | 5/1981 | Edwards |
| 4,285,485 A | 8/1981 | Burke |
| 4,298,151 A | 11/1981 | O'Connor |
| 4,332,337 A | 6/1982 | Kosecoff |
| 4,345,705 A | 8/1982 | Graber |
| 4,394,948 A | 7/1983 | Graber |
| 4,403,716 A | 9/1983 | Carlson et al. |
| 4,428,516 A | 1/1984 | Allen |
| 4,437,597 A | 3/1984 | Doyle |
| 4,452,385 A | 6/1984 | Prosen |
| 4,513,897 A | 4/1985 | Graber |
| 4,518,108 A | 5/1985 | Allen |
| 4,524,893 A | 6/1985 | Cole |
| 4,597,554 A | 7/1986 | James |
| 4,700,845 A | 10/1987 | Fretter |
| 4,702,401 A | 10/1987 | Graber et al. |
| 4,726,499 A | 2/1988 | Hoerner |
| 4,804,120 A | 2/1989 | Kraklio |
| 4,823,997 A | 4/1989 | Krieger |
| 4,830,250 A | 5/1989 | Newbold et al. |
| 4,856,686 A | 8/1989 | Workentine |
| 4,863,080 A | 9/1989 | Graber |
| 4,875,608 A | 10/1989 | Graber |
| 5,029,740 A | 7/1991 | Cox |
| 5,052,605 A | 10/1991 | Johansson |
| 5,056,699 A | 10/1991 | Newbold et al. |
| 5,056,700 A | 10/1991 | Blackburn et al. |
| 5,058,283 A | 10/1991 | Wise et al. |
| 5,118,020 A | 6/1992 | Piretti |
| 5,135,145 A | 8/1992 | Hannes et al. |
| D329,035 S | 9/1992 | Blackburn et al. |
| 5,157,842 A | 10/1992 | Swanda |
| D331,214 S | 11/1992 | Johnson |
| 5,169,042 A | 12/1992 | Ching |
| 5,195,670 A | 3/1993 | Piretti et al. |
| 5,211,323 A | 5/1993 | Chimenti et al. |
| 5,215,232 A | 6/1993 | Wyers |
| 5,259,542 A | 11/1993 | Newbold et al. |
| 5,299,773 A | 4/1994 | Bertrand |
| 5,303,857 A | 4/1994 | Hewson |
| D346,995 S | 5/1994 | Thulin |
| D348,640 S | 7/1994 | Hall |
| 5,360,150 A | 11/1994 | Praz |
| 5,363,996 A | 11/1994 | Raaber et al. |
| 5,373,978 A | 12/1994 | Buttchen et al. |
| 5,377,885 A | 1/1995 | Wyers |
| 5,398,422 A | 3/1995 | Clarkson |
| 5,476,202 A | 12/1995 | Lipp |
| 5,495,970 A | 3/1996 | Pedrini |
| 5,505,357 A | 4/1996 | Chimenti et al. |
| 5,527,146 A | 6/1996 | Allsop et al. |
| 5,573,165 A | 11/1996 | Bloemer et al. |
| 5,593,076 A | 1/1997 | Biondo |
| 5,598,960 A | 2/1997 | Allen et al. |
| D378,289 S | 3/1997 | Lundgren |
| 5,625,956 A | 5/1997 | Cone, II et al. |
| 5,636,816 A | 6/1997 | Burton et al. |
| 5,645,202 A | 7/1997 | Kaloustian |
| 5,690,260 A | 11/1997 | Aikins et al. |
| 5,692,659 A | 12/1997 | Reeves |
| 5,720,399 A | 2/1998 | Kohlhaas |
| 5,738,259 A | 4/1998 | Allen |
| 5,775,555 A | 7/1998 | Bloemer et al. |
| 5,806,196 A | 9/1998 | Gibbs et al. |
| 5,810,231 A | 9/1998 | Kravitz |
| 5,826,767 A | 10/1998 | Chimenti et al. |
| 5,833,074 A | 11/1998 | Phillips |
| 5,904,463 A | 5/1999 | Christensen |
| D412,482 S | 8/1999 | Chen |
| 5,938,093 A | 8/1999 | Bloemer et al. |
| 5,984,347 A | 11/1999 | Blanc-Rosset |
| 5,996,957 A | 12/1999 | Kurtz |
| 6,000,593 A | 12/1999 | Chimenti |
| 6,019,266 A | 2/2000 | Johnson |
| 6,053,336 A | 4/2000 | Reeves |
| 6,062,450 A * | 5/2000 | Noel ................. B60R 9/10 211/17 |
| 6,116,485 A | 9/2000 | Watkins |
| D447,997 S | 9/2001 | Ferman et al. |
| 6,283,349 B1 * | 9/2001 | Morris .............. B60R 9/048 224/502 |
| 6,286,738 B1 | 9/2001 | Robins et al. |
| 6,345,748 B1 | 2/2002 | Chimenti et al. |
| 6,386,407 B1 | 5/2002 | Erickson et al. |
| 6,422,443 B1 | 7/2002 | Erickson et al. |
| 6,439,397 B1 | 8/2002 | Reeves |
| 6,467,664 B2 | 10/2002 | Robins et al. |
| 6,502,729 B2 | 1/2003 | Ferman |
| 6,516,986 B1 * | 2/2003 | Lassanske .......... B60R 9/048 224/502 |
| 6,523,731 B1 | 2/2003 | Pedrini |
| 6,761,297 B1 | 7/2004 | Pedrini |
| 6,840,418 B2 | 1/2005 | Robins et al. |
| 6,857,545 B2 | 2/2005 | McLemore et al. |
| 6,968,986 B1 | 11/2005 | Lloyd et al. |
| 6,976,615 B2 | 12/2005 | Dean |
| 7,055,725 B1 | 6/2006 | Kolda |
| 7,118,016 B1 | 10/2006 | Kolda |
| 7,404,504 B2 | 7/2008 | Settelmayer |
| 7,434,714 B2 | 10/2008 | Huang |
| 7,810,685 B2 | 10/2010 | Bove et al. |
| 7,866,517 B2 | 1/2011 | Pedrini |
| D637,137 S | 5/2011 | Weaver et al. |
| 7,975,888 B2 | 7/2011 | Settelmayer |
| 8,025,196 B2 | 9/2011 | Flaherty et al. |
| 8,028,878 B1 | 10/2011 | Pedrini |
| D656,455 S | 3/2012 | Sautter et al. |
| D663,675 S | 7/2012 | Sautter et al. |
| 8,235,267 B2 | 8/2012 | Sautter et al. |
| 8,267,292 B2 | 9/2012 | Czornyj |
| 8,387,839 B2 * | 3/2013 | Sautter .............. B60R 9/06 224/42.13 |
| 8,444,032 B2 | 5/2013 | Pedrini |
| 8,490,847 B2 | 7/2013 | Sautter et al. |
| 8,573,456 B2 * | 11/2013 | Farber .............. B60R 9/06 224/314 |
| 9,358,933 B2 * | 6/2016 | Phillips ............. B60R 9/10 |
| 2002/0117524 A1 | 8/2002 | Jeong |
| 2003/0164390 A1 | 9/2003 | Higginbotham, III |
| 2003/0222112 A1 | 12/2003 | McLemore et al. |
| 2004/0028510 A1 | 2/2004 | Jones |
| 2004/0238582 A1 | 12/2004 | Pedrini |
| 2004/0256430 A1 | 12/2004 | Wang |
| 2005/0061842 A1 | 3/2005 | Tsai |
| 2005/0199669 A1 | 9/2005 | Robins et al. |
| 2005/0205629 A1 | 9/2005 | Wang |
| 2006/0032879 A1 | 2/2006 | Settelmayer |
| 2006/0032880 A1 | 2/2006 | Settelmayer |
| 2006/0060623 A1 | 3/2006 | Huang |
| 2006/0138186 A1 | 6/2006 | Pedrini |
| 2006/0186161 A1 | 8/2006 | Huang |
| 2006/0289580 A1 | 12/2006 | Faver et al. |
| 2007/0057001 A1 | 3/2007 | Wang |
| 2008/0190979 A1 | 8/2008 | Robins et al. |
| 2010/0127031 A1 | 5/2010 | Sautter et al. |
| 2012/0234883 A1 | 9/2012 | Sautter et al. |
| 2013/0327801 A1 * | 12/2013 | Prescott ............ B60R 9/06 224/500 |

(56) References Cited

U.S. PATENT DOCUMENTS

| | | | | |
|---|---|---|---|---|
| 2014/0239027 A1* | 8/2014 | Dickinson | ............... | B60R 9/06 224/534 |
| 2016/0001710 A1* | 1/2016 | Prescott | ................. | B60R 9/10 224/536 |
| 2016/0214545 A1* | 7/2016 | Prescott | ................. | B60R 9/06 |

FOREIGN PATENT DOCUMENTS

| | | |
|---|---|---|
| DE | 4225110 C2 | 4/1997 |
| FR | 2451296 A1 | 10/1980 |
| FR | 2668435 A1 | 4/1992 |
| FR | 1083830 A | 1/1995 |
| GB | 478828 A | 1/1938 |
| GB | 856748 A | 12/1960 |
| JP | 61122051 A | 6/1986 |
| JP | 3145441 U | 9/2008 |
| NL | 7704505 A | 12/1977 |
| SE | 98850 C | 3/1940 |
| WO | 9402338 A1 | 2/1994 |
| WO | 2006020540 A2 | 2/2006 |
| WO | 2006020937 A2 | 2/2006 |

\* cited by examiner

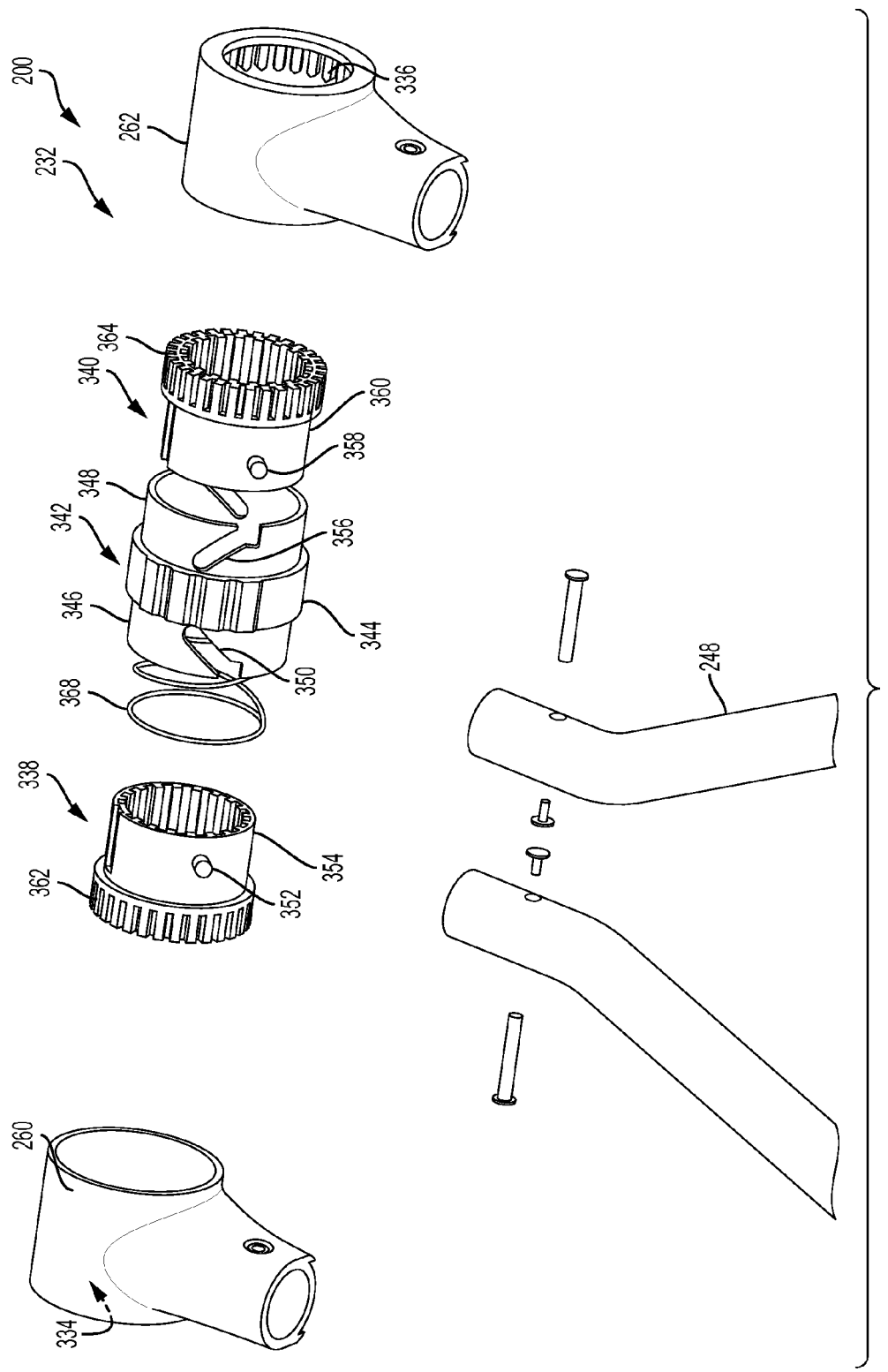

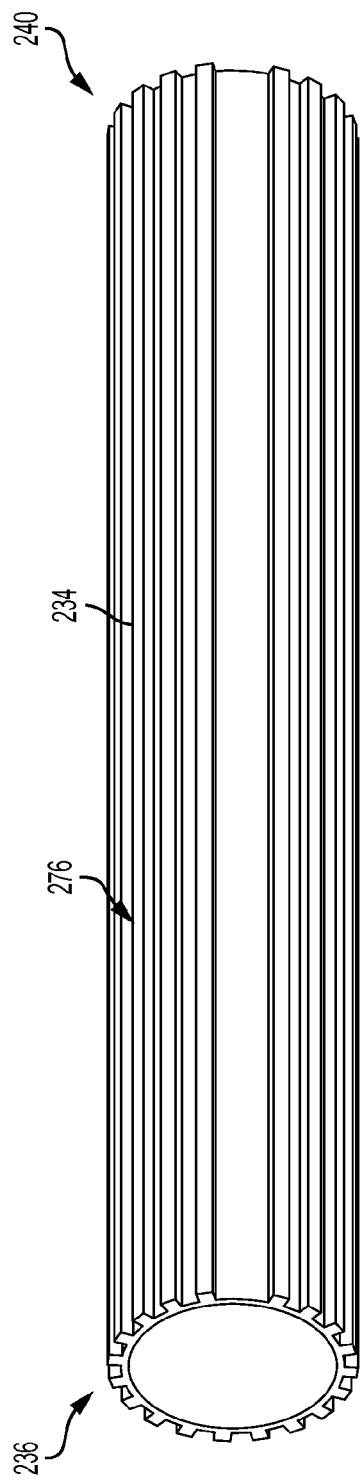
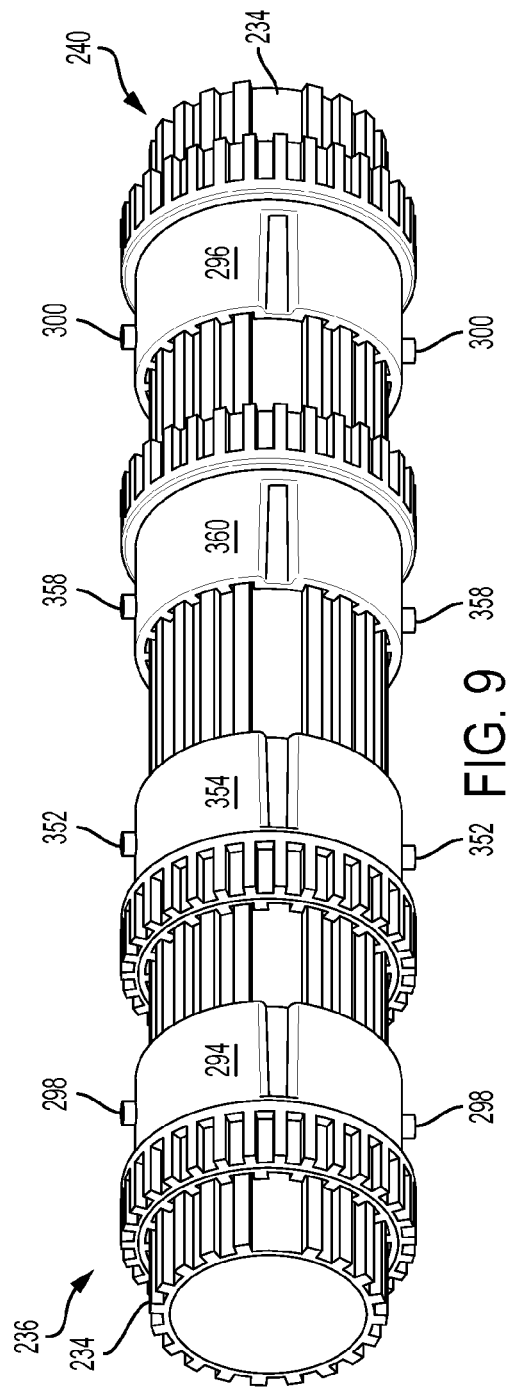

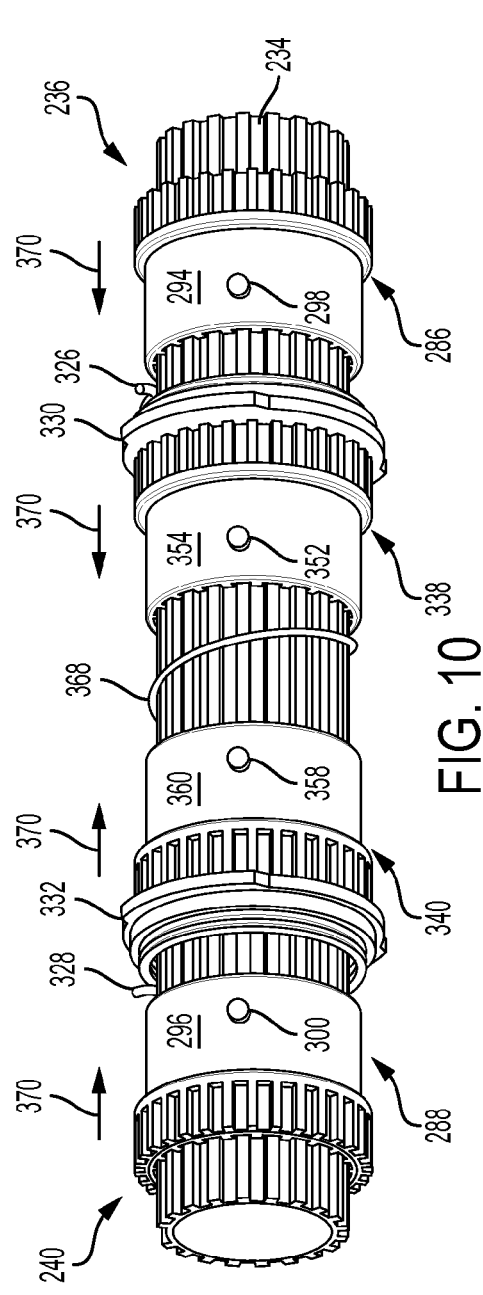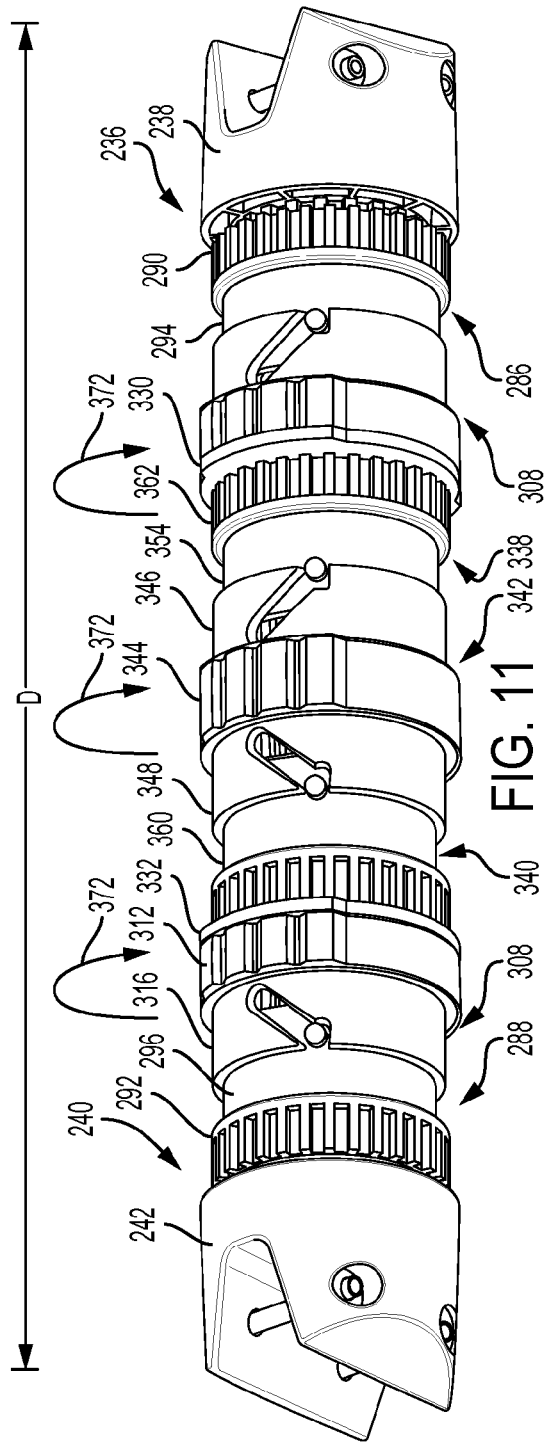

ADJUSTABLE BICYCLE CARRIER

CROSS-REFERENCES

The following related applications and materials are incorporated herein, in their entireties, for all purposes: U.S. Pat. No. 5,056,699; U.S. Pat. No. 5,259,542; U.S. Pat. No. 6,286,738; U.S. Pat. No. 6,386,407; U.S. Pat. No. 7,404,504; U.S. Pat. No. 7,975,888; and U.S. Pat. No. 8,490,847.

FIELD

This disclosure relates to systems and methods for carrying objects on motor vehicles. More specifically, the disclosed embodiments relate to trunk-mounted bicycle carriers.

INTRODUCTION

The popularity of recreational cycling has grown substantially in recent years. As a result, the demand for bicycle carriers to transport bikes on cars and other vehicles has also grown. There are various types of vehicle-mounted bicycle carriers available. One type is mountable on the trunk or other rear portion of a vehicle to carry one or more bicycles adjacent the rear of the vehicle. Typically, these carriers include support arms to support one or more bicycles. The frame and/or support arms typically include one or more adjustable features for adapting the carrier to different vehicle profiles, and for modifying the carrier between collapsed and carrying configurations.

SUMMARY

The present disclosure provides systems, apparatuses, and methods relating to adjustable bicycle carriers. In some embodiments, an adjustable bicycle carrier may include a frame having a continuous, closed outer perimeter, the configuration of the frame being the same in a collapsed position and a use position of the carrier; a hub assembly spanning the frame, the hub assembly including an axle member attached at each end to the frame by a fixed connection; a plurality of limb members, each limb member having a proximal end rotatably connected to the axle member of the hub assembly; a plurality of release mechanisms, one for each of the limb members, each of the release mechanisms having a manual interface rotatable about a long axis of the axle member and an associated set of locking portions movable by the release mechanism in a direction parallel to the long axis of the axle member; wherein each of the limb members is selectively operable in (a) a locked mode, in which the respective set of locking portions are engaged with the proximal end of the limb member, and (b) an unlocked mode, in which the respective release mechanism is rotated, the set of locking portions are disengaged from the limb member, and the limb member is rotatably positionable relative to the axle member.

In some embodiments, an adjustable bicycle carrier may include a frame having a pair of opposing lateral frame portions; a hub assembly including an axle member having opposing ends respectively affixed to the opposing lateral frame portions; a release sleeve rotatably connected around the axle member, the release sleeve including a knob portion and an actuating portion having a helical slot formed therein; a locking sleeve keyed to the axle member such that the locking sleeve is translatable along a length of the axle member, the locking sleeve having an outer surface including a plurality of circumferentially disposed first teeth and a protrusion configured to interface with the helical slot of the release sleeve; and a limb member having a proximal hub portion rotatably connected around the axle member and a distal portion protruding from the hub assembly, the hub portion having an inner surface including a plurality of second teeth; wherein the bicycle carrier is selectively operable in a locked mode, in which the first teeth engage with the second teeth to prevent rotation of the limb member with respect to the axle member, and an unlocked mode, in which the release sleeve is rotated, the protrusion of the locking sleeve is urged in a lateral direction by the helical slot, the locking sleeve is translated along the axle member, and the first teeth are disengaged from the second teeth to allow rotational positioning of the limb member.

An illustrative method for adjusting a bicycle carrier may include unlocking a selectively rotatable limb member of a bicycle carrier from a fixed central axle by rotating a release knob about the fixed central axle to force a corresponding locking sleeve to translate along the fixed central axle, thereby disengaging the locking sleeve from the support arm; rotating the limb member about the fixed central axle to a selected angular position while maintaining the position of the release knob; and locking the limb member in the selected angular position by rotating the release knob to cause the locking sleeve to reengage with the limb member; wherein the locking sleeve is keyed to the fixed central axle, such that the locking sleeve is prevented from rotating.

Features, functions, and advantages may be achieved independently in various embodiments of the present disclosure, or may be combined in yet other embodiments, further details of which can be seen with reference to the following description and drawings.

BRIEF DESCRIPTION OF THE DRAWINGS

FIG. 7 is an exploded view of a central portion of the device of FIG. 7.

FIG. 8 is an isometric view of an illustrative splined axle portion of a bicycle carrier in accordance with aspects of the present disclosure.

FIG. 9 is an isometric view of the axle portion of FIG. 8 with illustrative lock portions splined thereon.

FIG. 10 is an isometric view of the axle and lock portions of FIG. 9, rotated toward the viewer and including illustrative stop and spring portions.

FIG. 11 is an isometric view of the axle, lock portions, stops, and springs of FIG. 10, further including illustrative actuating release portions and end connectors.

DESCRIPTION

Overview

Various embodiments of an adjustable bicycle carrier, as well as related methods, are described below and illustrated in the associated drawings. Unless otherwise specified, an adjustable carrier and/or its various components may, but are not required to, contain at least one of the structure, components, functionality, and/or variations described, illustrated, and/or incorporated herein. Furthermore, the process steps, structures, components, functionalities, and/or variations described, illustrated, and/or incorporated herein in connection with the present teachings may, but are not required to, be included in other embodiments and similar carriers. The following description of various embodiments is merely exemplary in nature and is in no way intended to limit the disclosure, its application, or uses. Additionally, the advantages provided by the embodiments, as described below, are illustrative in nature and not all embodiments provide the same advantages or the same degree of advantages.

Figure 1:
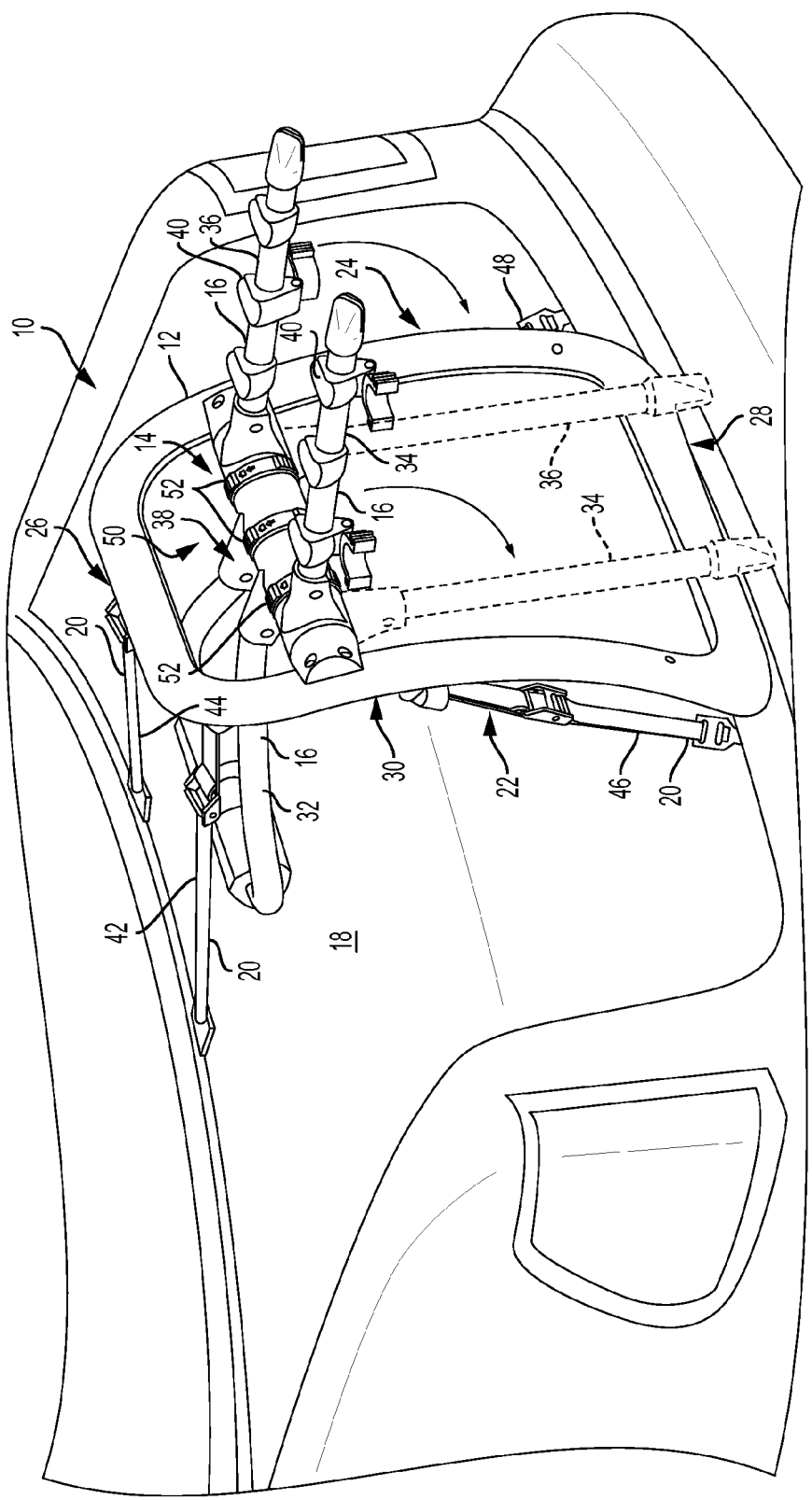
FIG. 1 is a perspective view of an illustrative adjustable bicycle carrier mounted on a vehicle.

In general, and with reference to FIG. 1, an adjustable bicycle carrier 10 may include a frame 12, a hub assembly 14 spanning the frame, and one or more limb members 16 rotatably mounted on the hub assembly. Carrier 10 may be removably mounted or otherwise installed on a supporting vehicle 18. Mounting may be facilitated by one or more vehicle engagement straps 20.

Frame 12 may include any suitable structure configured to support other components and provide structure for carrier 10. In the example shown in FIG. 1, frame 12 forms a continuous frame including a pair of opposing lateral portions 22, 24, an upper portion 26, and a lower portion 28, such that the frame forms a closed perimeter 30. Lower portion 28 is configured to abuttingly engage supporting vehicle 18. In some examples, frame 12 may comprise discrete portions and/or more or fewer portions than just described. In other examples, such as the one depicted in FIG. 1, frame 12 may form a continuous, closed shape. For example, frame 12 may be generally polygonal, oval, or any other suitable shape. For example, frame 12 has a four-sided shape (e.g., trapezoidal). Each of portions 22-28 may include curvilinear or rectilinear portions, or any combination of these. Frame 12 may include rigid members, and may include a protective padding, coating, or resilient material configured to protect supporting vehicle 18 and/or any equipment (e.g., bicycle) supported on the carrier.

Hub assembly 14 may include an elongate hub assembly spanning frame 12. Hub assembly 14 may be affixed to frame 12, such as by a fixed connection at each end of the hub assembly. Hub assembly 14 may be spaced from upper portion 26 of frame 12. In other words, hub assembly 14 may span the frame at a vertically intermediate position, such that upper portion 26 and parts of lateral portions 22 and 24 extend above the hub assembly. As described further below, this arrangement may be advantageous, e.g., for strap anchor placement.

Limb members 16 may include any suitable rigid members having a proximal end rotatably attached to hub assembly 14 and a distal end protruding therefrom. Each limb member 16 may further be selectively positionable at various radial angles with respect to the hub assembly. In the example depicted in FIG. 1, limb members 16 include a foot member 32 and a pair of support arms 34, 36 (also referred to as equipment support arms). Foot member 32 may include any suitable structure adjustably coupled to the hub assembly at a foot connection region 38 and configured to abut vehicle 18 at a location spaced from lower portion 28 of the frame. Foot member 32 and lower portion 28 may be configured to structurally support the carrier and any carried equipment (e.g., bicycle(s)) on vehicle 18. Foot member 32 may be adjusted about hub assembly 14 to provide a selected configuration suitable for the particular type of vehicle 18. When a suitable configuration is found, foot member 32 may be locked in place on hub assembly 14.

Support arms 34 and 36 may include any suitable structure adjustably coupled to the hub assembly and configured to support one or more objects, such as bicycles, on the carrier. In the example depicted in FIG. 1, support arms 34 and 36 are a pair of substantially identical equipment support arms adjustably coupled to the hub assembly 14 at positions straddling foot connection region 38. One or more cradles 40 may be installed on the support arms to facilitate bicycle attachment. Examples of suitable cradles 40 are described in U.S. Pat. No. 6,286,738, the entirety of which is hereby included by reference herein for all purposes. Similar to foot member 32, each support arm 34 and 36 may be adjusted about hub assembly 14 to a selected angle. In some examples, support arms 34 and 36 may be adjusted as a pair. In some examples, support arms 34 and 36 may be independently adjustable.

A plurality of vehicle engagement straps 20 may be used to secure carrier 10 to vehicle 18. For example, upper straps 42 and 44 may extend from respective anchor points on upper portion 26 of frame 12. Each upper vehicle engagement strap may be attached at one end to frame 12 above hub assembly 14. For example, anchor points of straps 42 and 44 may be disposed at upper corners of the frame. Distal ends of straps 42 and 44 may include a hook or other connector for attachment to portions of the vehicle.

Angular positions of limb members 16 may be adjusted as described above. To facilitate this selective adjustability, one or more release mechanisms 50 (also referred to as locking mechanisms) may be included to selectively lock each limb member to a fixed portion of the hub assembly. A more detailed description of the release/lock mechanisms is included below. In general, each release mechanism 50 may include a manual release knob 52 disposed on the hub assembly between opposing lateral portions 22, 24 of frame 12. Each release knob 52 may be disposed on a circumferential surface of hub assembly 14. Each release knob 52 may be adjacent a corresponding limb member 16. Release mechanisms 50 may include any suitable structures and devices configured to convert rotational motion of the release knob into axial motion of a corresponding locking mechanism configured to selectively interlock with one or more of the limb members.

Examples, Components, and Alternatives

The following sections describe selected aspects of exemplary adjustable bicycle carriers as well as related systems and/or methods. The examples in these sections are intended for illustration and should not be interpreted as limiting the entire scope of the present disclosure. Each section may include one or more distinct examples, and/or contextual or related information, function, and/or structure.

Figure 2:
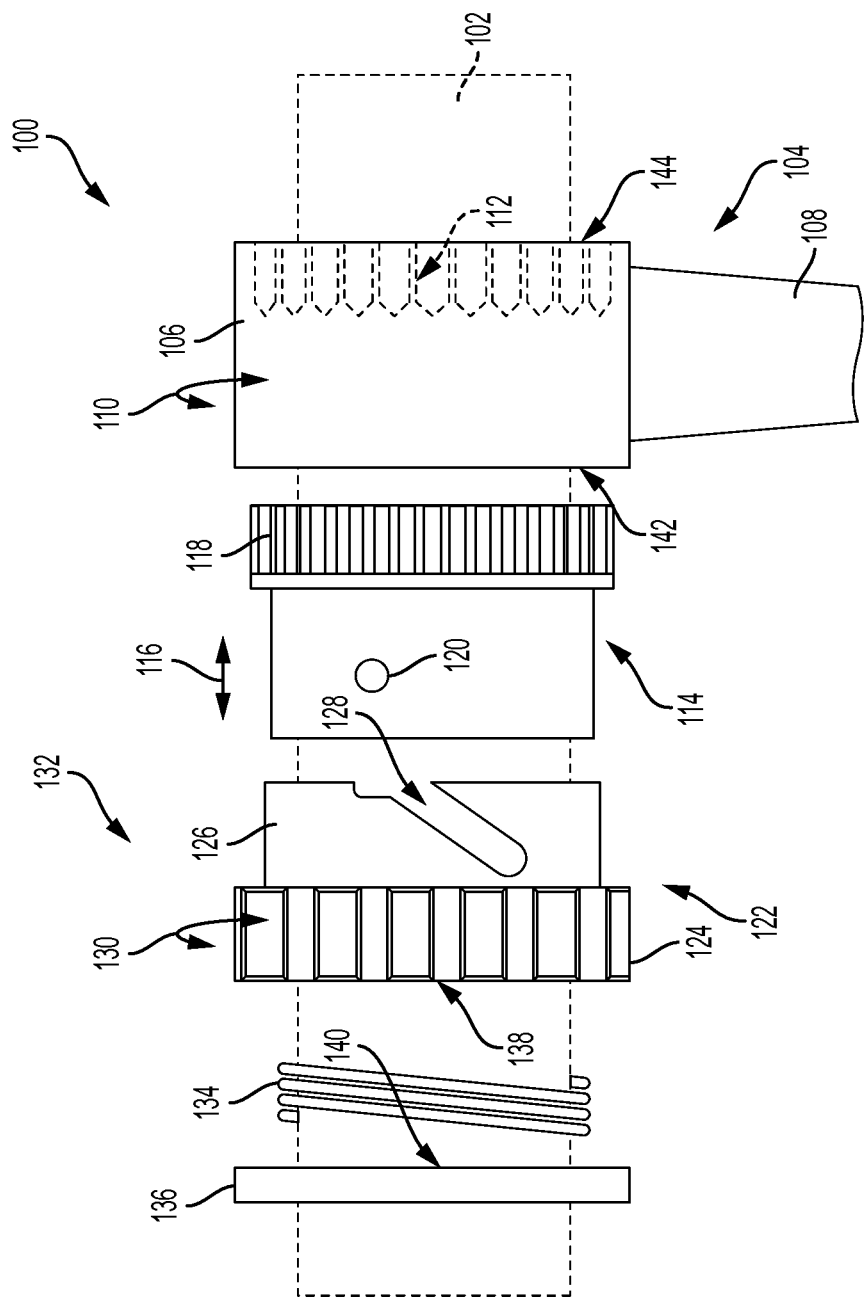
FIG. 2 is a schematic diagram showing an illustrative lock and release mechanism for an adjustable bicycle carrier hub.

Release and Adjustment Mechanism:

As shown in FIG. 2, this section describes an illustrative hub assembly 100 having a rotatable release mechanism. The hub assembly described in this section is an example of hub assembly 14, described above. Accordingly, similar components may be labeled with similar reference numbers.

FIG. 2 is a schematic diagram of a portion of hub assembly 100. The assembly is shown in a partially-exploded view, with axial separation of components that are directly adjacent or at least partially nested when in use.

Hub assembly 100 includes a central axle 102, on which the other components are mounted. Central axle 102 may include any suitable elongate structure configured to provide a structural pivot for limb members of the bicycle carrier and a mounting surface for components of the release mechanism. Axle 102 may be interchangeably referred to as a shaft, spindle, pivot, and/or axle member. Axle 102 may be generally cylindrical, and may include one or more key or spline portions for interfacing with corresponding keys or splines on other components, as described further below. In some embodiments, axle 102 may be fixed (i.e., non-rotating), such that other components rotate or otherwise move about the stationary axle. Axle 102 may be a single, continuous axle. In some examples, axle 102 may include a plurality of discrete axle portions.

A limb member 104 may include a proximal hub portion 106 rotatably connected around axle 102, and a distal portion 108 protruding from the hub assembly. As indicated by arrow 110, limb member 104 may be selectively rotatable around the axle of the hub assembly. Limb member 104 is an example of limb member 16, described above, and may comprise a support arm, a foot member, or the like.

Hub portion 106 may be generally cylindrical or tubular, and may have an inner surface including a plurality of teeth 112 disposed around an inner circumference. Teeth 112 may extend only partially across a width of hub portion 106, such that a lateral portion of the inner surface is smooth or otherwise free of teeth. Teeth 112 may include any suitable series or pattern of protrusions, recesses, castellations, keys, keyways, nubs, holes, slots, and/or the like, or any combination of these, configured to interface with a series or pattern of corresponding elements on a locking sleeve, as described below. Absent an intervening component, teeth 112 do not protrude to the point of interference with rotation of limb member 104 about the axle. In some examples, teeth 112 do not come into contact with the axle, and the effective inner diameter of the hub portion is greater than the effective outer diameter of the axle. Rotation of hub portion 106 about axle 102 causes distal portion 108 to be placed in a selected angular position with respect to the axle.

A generally cylindrical locking sleeve 114 may be installed on axle 102, and may be keyed to the axle such that locking sleeve 114 is prevented from rotating about the axle. The locking sleeve may be free to translate axially along a length of the axle, as indicated by arrow 116. For example, locking sleeve 114 may be splined to axle 102, which may have a pattern of axially-oriented splines around at least a portion of the axle outer surface. A corresponding spline pattern may be present on an interior surface of the locking sleeve. In some examples, locking sleeve 114 and axle 102 may be coupled by a key and keyway. Any suitable connection allowing axial movement but restricting rotational movement may be utilized.

Locking sleeve 114 may have an outer surface that includes a plurality of teeth 118 and a protrusion 120. Teeth 118 may include any suitable elements corresponding to teeth 112, described above. Teeth 118 may extend across a portion of the locking sleeve, and may be configured to interface, mate with, or otherwise engage teeth 112 of limb member 104, such that the locking sleeve and hub portion 106 are coupled together as a rotational unit when teeth 112 and 118 are engaged. Although teeth 112 and 118 are referred to as "teeth," it is noted that other suitable elements may be utilized. For example, as described above, the teeth may include pins and holes, keys and slots, or any other suitable combination of elements that can releasably couple the hub portion and the locking sleeve together such that the hub portion cannot rotate relative to the locking sleeve when engaged.

Locking sleeve 114 is configured and sized to nest within hub portion 106 of limb member 104, and is generally disposed between the hub portion and the axle. Locking sleeve 114 is axially slidable relative to the limb member, such that teeth 118 can be engaged and disengaged from teeth 112 by translating the locking sleeve in an axial direction. As described below, this axial translation may be produced by interlocking portions of the locking sleeve and an adjacent release component.

Protrusion 120, also referred to as a pin, is included on a non-toothed portion of the locking sleeve. Protrusion 120 extends radially from a fixed position on the outer surface of the locking sleeve. Protrusion 120 may include any suitable pin configured to interface with a corresponding slot, as described below. More than one such protrusion may be present.

A generally cylindrical release sleeve 122 may be installed on axle 102 adjacent to, and interlocked with locking sleeve 114. Release sleeve 122 may include a manual interface, also referred to as a knob portion 124, and an actuator portion 126.

Release sleeve 122 may be rotatably attached around axle 102, such that knob portion 124 is accessible by a user, and actuator portion 126 nests with locking sleeve 114 between hub portion 106 and axle 102. Actuator portion 126 may include a helical slot 128 configured to receive protrusion 120 of locking sleeve 114. Helical slot 128 may include any suitable helical member configured to guide a follower member, such as protrusion 120 along an axial path as the helical member is rotated relative to the follower member.

For example, rotation of release sleeve 122 in the direction indicated by arrow 130 will rotate actuator portion 126 about axle 102. This rotation will cause helical slot 128 to rotate in the same direction. As described further below, release sleeve 122 is prevented from moving axially. Accordingly, protrusion 120, which is captured by slot 128, will be forced to move in an axial direction as the protrusion moves along the angled slot. The remainder of the locking sleeve will move with the pin. In other words, turning the release sleeve causes the locking sleeve to move axially due to the interlocked arrangement of the two components. Therefore, teeth 118 of locking sleeve 114 can be moved into and out of engagement with teeth 112 of hub portion 106 of the limb member, by rotating knob portion 124.

Release sleeve 122 and locking sleeve 114 are interlocked, as described above. However, any suitable interlock mechanism configured to convert rotational movement into axial movement may be utilized. For example, slot 128 and protrusion 120 may be reversed, such that the slot is on the locking sleeve and the pin is on the release sleeve. In some examples, multiple pins may interface with multiple respective slots.

Together, release sleeve 122 and locking sleeve 114 comprise a release mechanism 132. Release mechanism 132 may be biased by a biasing member 134. Biasing member 134 may include any suitable structure or device configured to bias release sleeve 122 and/or locking sleeve 114 in a locking direction, i.e., a direction that tends to result in engagement of teeth 118 with teeth 112. For example, biasing member 134 may include a spring. In some examples, biasing member 134 includes a torsion spring, coaxial with axle 102 and anchored to axle 102 and release sleeve 122 (e.g., to knob portion 124). In these examples, rotation of knob portion 124 in a releasing direction is opposed by the spring, which urges the knob to its starting position when the knob is released. In some examples, biasing member 134 includes a compression spring configured to urge locking sleeve 114 toward the locking direction. For example, the compression spring may be coaxial with axle 102, and may mechanically interface with. In these examples, releasing knob portion 124 will again cause the knob to return to its unrotated position. However, the effect will be caused indirectly by the spring via the interlock between the locking sleeve and release sleeve.

A mechanical stop 136 may be installed on axle 102, and may be splined or otherwise keyed to the axle, as described regarding the locking sleeve. Mechanical stop 136 may include any suitable structure configured to stop or otherwise function as an axial abutment for other components.

As mentioned above, the various components of hub assembly 100 are shown schematically as spread apart axially. When assembled and operational, the various components are nested and/or pressed together side-by-side. Knob portion 124 of release sleeve 122 has a first lateral edge 138, and steps down to actuator portion 126 to form an opposing lateral edge 140. Similarly, hub portion 106 of limb member 104 has a first lateral edge 142 and a second, opposing lateral edge 144. When assembled, first lateral edge 138 of the release knob is adjacent the mechanical stop, and second lateral edge 140 of the release knob abuts first lateral edge 142 of the hub portion. Actuator portion 126 and locking sleeve 114 are nested within hub portion 106. Actuator portion 126 is diametrically larger than the untoothed portion of locking sleeve 114. Accordingly, depending on the degree of rotation of the release sleeve, locking sleeve 114 may be at least partially nested inside actuator portion 126. Note that this arrangement may be reversed in some examples, with the untoothed portion of locking sleeve 114 being diametrically larger than actuator portion 126. When assembled, the hub portion and the release sleeve are each restricted from axial movement by adjacent portions of the hub assembly, possibly including other components not shown in FIG. 2.

Illustrative Carrier:

As shown in FIGS. 3-11, this section describes an adjustable bicycle carrier 200. Bicycle carrier 200 is an example of bicycle carrier 10, and incorporates an example of hub assembly 100, described above. Accordingly, similar components may be labeled with similar reference numbers.

Figure 3:
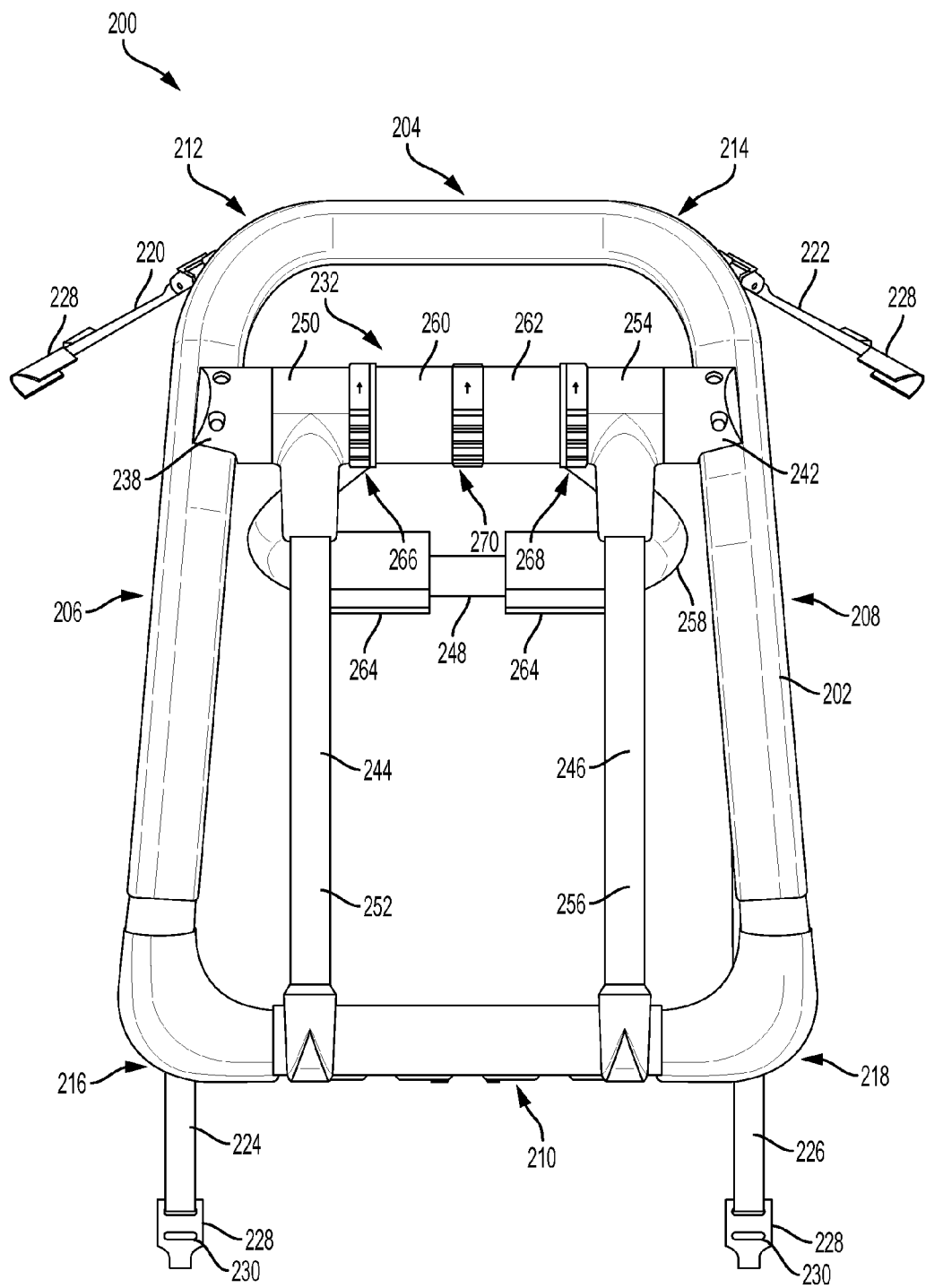
FIG. 3 is a rear elevation view of an illustrative adjustable bicycle carrier in accordance with aspects of the present disclosure.
Figure 4:
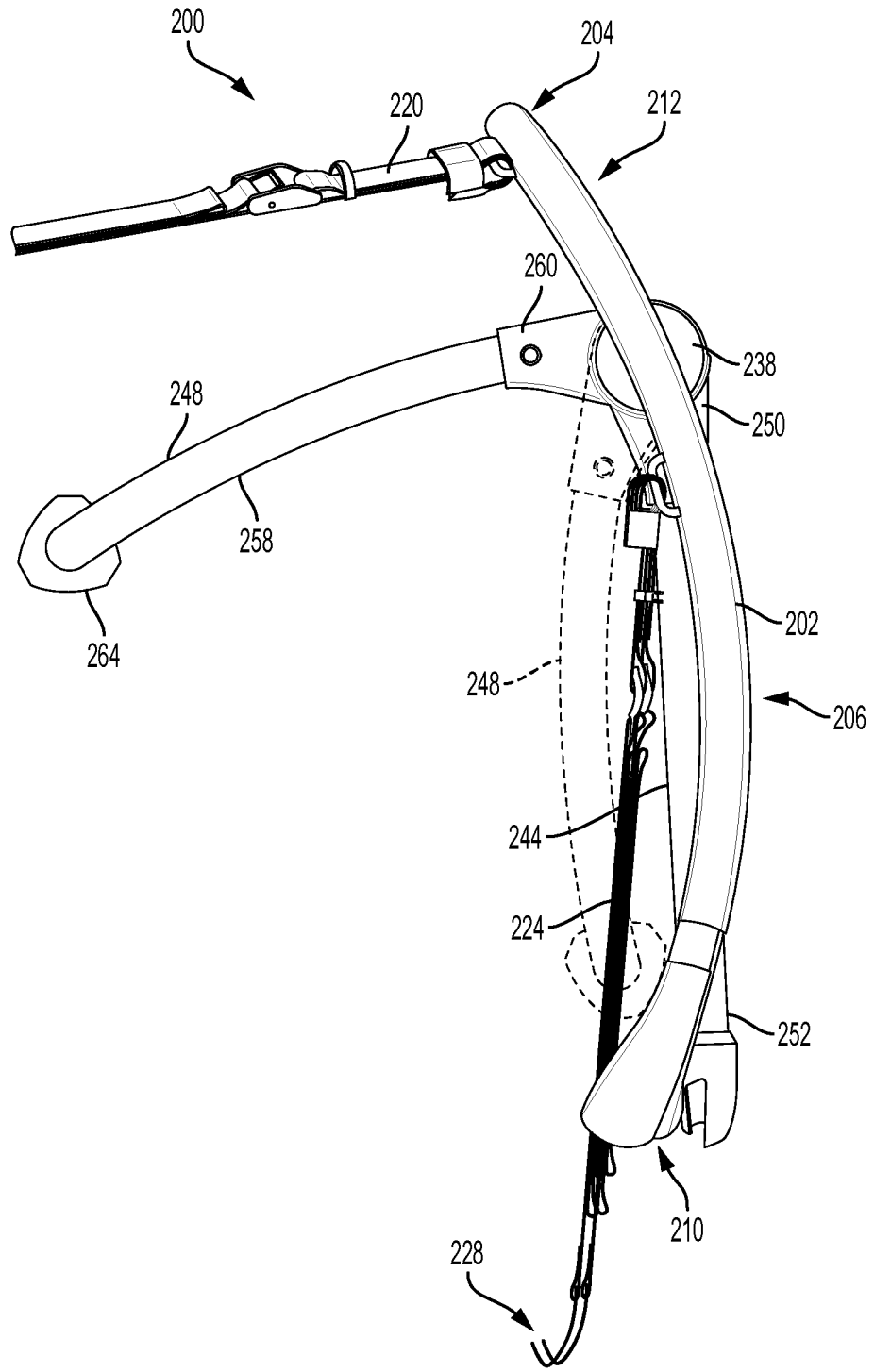
FIG. 4 is a side elevation view of the device of FIG. 3.
Figure 5:
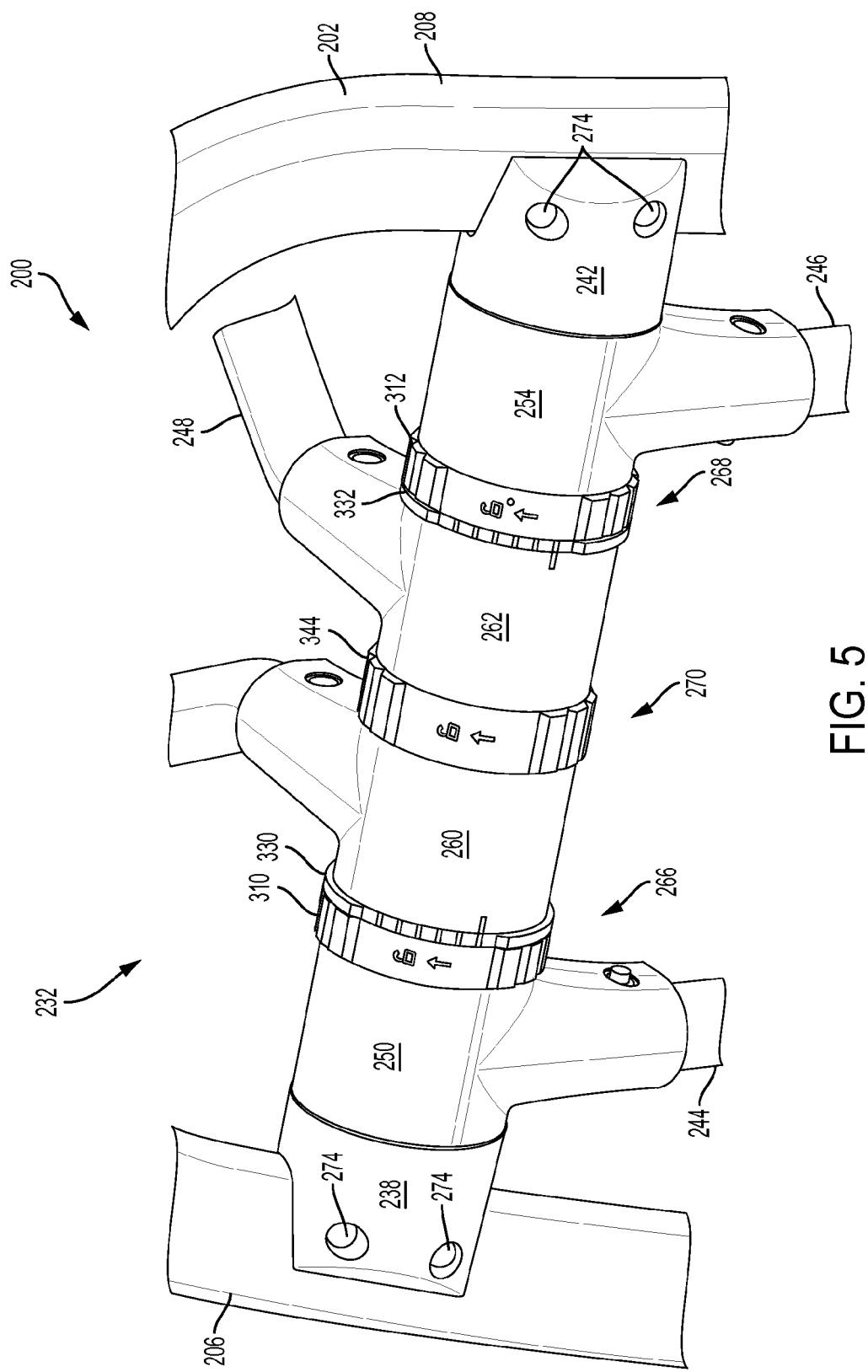
FIG. 5 is an isometric partial view of an adjustable hub portion of the device of FIG. 3.

FIGS. 3 and 4 are rear and side elevation views, respectively, of adjustable bicycle carrier 200, shown with support arms lowered, and with a foot member and vehicle engagement straps extended. FIG. 5 is an isometric view of a hub assembly of carrier 200, and FIGS. 6-11 are various views showing the components and functionality of the hub assembly.

As shown in FIGS. 3 and 4, carrier 200 includes a frame 202 that forms a continuous, closed outer perimeter. Frame 202 is generally trapezoidal, having an upper portion 204, a pair of opposing lateral portions 206 and 208, and a lower portion 210. Lateral portions 206 and 208 are generally arcuate when viewed from the side, as in FIG. 4. Corners of frame 202 are generally rounded, defining a pair of upper corners 212 and 214 and a pair of lower corners 216 and 218. Lower portion 210 may be configured to abut a supporting vehicle (as shown in FIG. 1).

Vehicle engagement straps are attached to the frame at four points. Specifically, upper vehicle engagement straps 220 and 222 are attached, respectively, at corners 212 and 214. Lower vehicle engagement straps 224 and 226 are attached, respectively, to intermediate positions on lateral portions 206 and 208. Each strap is adjustable in length, and terminates at a distal end in a respective hook 228 configured to engage a portion of the support vehicle. Each hook 228 may include an aperture 230, through which a portion of the strap may be passed to alter the orientation and functionality of the hook. For example, the strap may be looped through the aperture, such that the strap pulls at a transverse angle on an intermediate point of the hook rather than in line with the hook, facilitating attachment, e.g., to a glass panel.

An elongate hub assembly 232 is affixed at either end to frame 202, spanning the frame from lateral portion 206 to lateral portion 208. Hub assembly 232 includes a fixed central axle 234, which is secured at a first end 236 to lateral portion 206 by a fastener 238, and at a second end 240 to lateral portion 208 by a substantially identical fastener 242.

Carrier 200 includes three limb members, in the form of a first equipment support arm 244, a second equipment support arm 246, and a foot member 248, each of which is rotatably connected to hub assembly 232 at a respective proximal end. Specifically, support arm 244 is connected to hub assembly by a proximal hub portion 250 and includes an elongate distal portion 252 that protrudes from the hub assembly. Similarly, support arm 246 is connected to hub assembly by a proximal hub portion 254 and includes a protruding elongate distal portion 256. Foot member 248 includes a distal loop or hoop portion 258, and is connected to hub assembly 232 by a pair of proximal hub portions 260 and 262. Hoop portion 258 includes one or more pads or cushions 264 attached to the foot member. The padded portion of foot member 248 may be configured to abuttingly engage the supporting vehicle at a location spaced from the frame (as shown in FIG. 1).

Hub assembly 232 includes three release mechanisms 266, 268, and 270, corresponding to support arm 244, support arm 246, and foot member 248, respectively. Each of the release mechanisms is an example of release mechanism 132, described above. Operation of each release mechanism frees the respective limb member to rotate about the hub axis. For example, foot member 248 may be rotated between a selected use position and a collapsed position, as indicated by the dashed outline of foot member 248 in FIG. 4. Similarly, each of the support arms may be rotated between an extended, or use position (e.g., as shown in FIG. 1) to a collapsed position as shown in FIG. 4. Accordingly, bicycle carrier 200 may be placeable into at least two overall positions: a collapsed position, in which the foot member and the support members are all in collapsed positions with distal ends adjacent to the frame, and a use position, in which distal ends of the foot member and the support members are rotated away from the frame to selected orientations (e.g., for mounting on a vehicle and carrying one or more bicycles).

Figure 6:
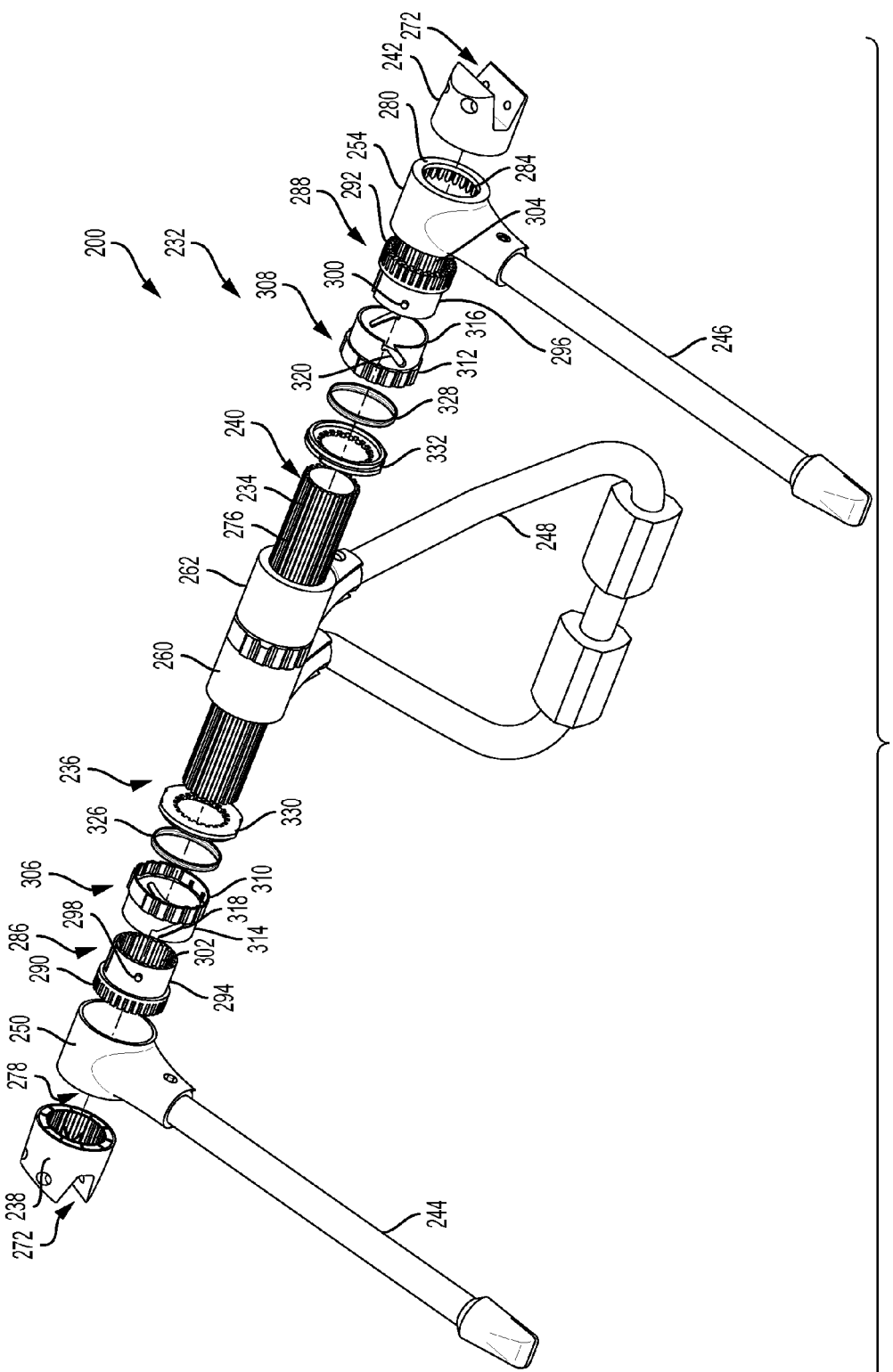
FIG. 6 is a partially exploded view of rotationally adjustable portions of an illustrative bicycle carrier in accordance with aspects of the present disclosure.

Turning to FIGS. 5-11, operation and specific components of release mechanisms 266-270 will now be described in more detail. FIG. 5 is an isometric view of hub assembly 232. FIG. 6 is a partially exploded isometric view of hub assembly 232. FIG. 7 is an exploded isometric view of release mechanism 270 and hub portions 260 and 262. FIG. 8 is an isometric view of axle 234. FIG. 9 is an isometric view of four locking sleeves arranged on axle 234. FIG. 10 is an isometric view of the assembly of FIG. 9, as well as various springs and mechanical stops. FIG. 11 is an isometric view of the assembly of FIG. 10, adding release sleeves and fasteners 238 and 242.

Beginning now generally at the outer ends of hub assembly 232 and working inward, fasteners 238 and 242 are attached at lateral ends 236 and 240 to frame 202. As best seen in FIGS. 5 and 11, outboard ends of the fasteners form slots 272 in which the lateral sides 206 and 208 of frame 202 are attached (e.g., pinned or bolted), using fastener members 274.

Axle 234 is splined to fasteners 238 and 242, thereby holding the axle in a fixed rotational orientation relative to the frame. Specifically, interiors of fasteners 238 and 242 have a spline pattern that matches or mates with an outer spline pattern 276 on axle 234. As best seen in FIG. 8, spline pattern 276 includes a plurality of spline members spaced around an outer perimeter of the axle, including a uniquely-sized gap. The gap may indicate desired positioning of certain components, such as locking sleeves, configured to be installed on the axle. These components may have an internal spline pattern that matches that of the axle, mating properly with the gap when in a selected or desired orientation.

Support arms 244 and 246 are immediately adjacent the fasteners, and abut the fasteners when assembled, such that outboard end faces 278 and 280 of hub portions 250 and 254 of the support arms may rotate in frictional contact with the fasteners. A lip may be formed on end faces 278 and 280, for example, to facilitate secure frictional fit. A plurality of teeth 284 are disposed around an inner circumference of each of the respective hub portions. Teeth 284 are substantially as described above, with respect to teeth 112. As best seen in FIG. 6, these teeth extend axially across only an outboard section or portion of the respective hub portion. Teeth 284 include a series of ridges having a long dimension in the axial direction and running around a complete inner circumference of each hub portion. In some examples, teeth 284 may have other topologies and/or may extend only partially around the circumference.

A pair of locking sleeves 286 and 288 nest within hub portions 250 and 254. The locking sleeves include a plurality of locking portions or locking teeth 290 and 292 disposed on respective end circumferences, the locking teeth configured to selectively engage or mate with teeth 284 when the locking sleeves are moved axially. A non-toothed sleeve portion, 294 and 296, steps down and extends inboard from the locking teeth. Each non-toothed portion includes a pair of diametrically opposed pins, indicated at 298 on locking sleeve 286 and 300 on locking sleeve 288. As described above regarding protrusion 120, these pins are configured to interlock and interoperate with a corresponding slot feature on the release sleeve described below.

Inner surfaces 302 and 304 of locking sleeves 286 and 288 are splined to mate with outer spline pattern 276 of axle 234. The splines of the locking sleeves and the axle run along the respective surfaces in an axial direction. Accordingly, locking sleeves 286 and 288 are free to translate along axle 234, but are keyed to the axle and thereby prevented from rotating.

A first release sleeve 306 and a second release sleeve 308 are partially nested within the hub portions, between the wall of the hub portion and that of the non-toothed sleeve portion of the respective locking sleeve. A release knob 310, 312 is externally accessible to a user, and may be knurled or otherwise frictionally enhanced as a manual interface for rotating the release knob. An actuating sleeve portion 314, 316 extends in an outboard direction from the release knob to nest as described.

Actuating sleeve portions 314 and 316 each has a pair of diametrically opposed helical slots, indicated at 318 on release sleeve 306 and 320 on release sleeve 308. Helical slots 318 and 320 are configured to interlock and interoperate with pins 298 and 300, as described above regarding protrusion 120 and slot 128. Accordingly, rotation of the release sleeve will cause the corresponding locking sleeve to translate axially into and out of engagement with the teeth of the hub portion.

Taken together, release sleeve 306 and locking sleeve 286 may comprise first release mechanism 266. Likewise, release sleeve 308 and locking sleeve 288 may comprise second release mechanism 268. First release mechanism 266 and second release mechanism 268 may further include a respective torsion spring 326, 328. Torsion springs 326 and 328 are coaxial with axle 234, and are anchored to a respective release knob or release sleeve, and to the axle (directly or indirectly). Accordingly, each of the release sleeves is biased against rotation, and is urged to return to its unrotated position when released.

A pair of spacers or mechanical stops 330 and 332 are splined to axle 234 inboard of the release knobs. Mechanical stops 330 and 332 may function as a Mechanical stop 330 and/or 332 may include indicia or markings indicating spaced positions around at least a portion of the circumference of the hub assembly. These may be utilized to determine or memorialize a rotational position of foot member 248, which may include one or more markings or indicia for that purpose. See FIG. 5. Furthermore, mechanical stops 330 and 332 may function as abutments or lateral spacers configured to prevent axial movement of the rotating components of hub assembly 232.

With specific reference to FIGS. 6 and 7, proximal hub portions 260 and 262 of foot member 248 rotatably attach around axle 234 inboard of the mechanical stops. Each of these hub portions is substantially identical to hub portions 250 and 254, with a plurality of inner teeth 334, 336 disposed around an outboard portion of each respective inner surface. Similarly, locking sleeves 338 and 340 are nested within hub portions 260 and 262. Locking sleeves 338 and 340 are substantially identical to locking sleeves 286 and 288.

A central release sleeve 342 is disposed between and interlocks with both locking sleeve 338 and locking sleeve 340. Central release sleeve 342 includes a central release knob 344 and a pair of actuating sleeve portions 346 and 348, extending in outboard directions from the central release knob. Actuating sleeve portion 346 includes a pair of helical slots 350 configured to interlock and interoperate with a pair of pins 352 on an untoothed portion 354 of locking sleeve 338. Likewise, actuating sleeve portion 348 includes a pair of helical slots 356 configured to interlock and interoperate with a pair of pins 358 on an untoothed portion 360 of locking sleeve 340. Accordingly, rotation of central release sleeve 342 causes locking teeth 362 and 364 of locking sleeves 338 and 340 to translate axially into and out of engagement with teeth 334 and 336 of the foot hub portions.

Taken together, central release sleeve 342 and locking sleeves 338, 340 may comprise foot member release mechanism 270. Foot member release mechanism 270 may further include a compression spring 368. Compression spring 368 is coaxial with axle 234, and is configured to urge one or both of locking sleeves 338, 340 in an outboard direction. Accordingly, release sleeve 342 is urged toward its unrotated position by virtue of the helical interlock between the locking sleeves and the central release sleeve.

Turning specifically to FIGS. 9-11, various relationships between components can be illustrated. For example, as depicted in FIGS. 9 and 10, the various locking sleeves are splined to axle 234, with a specific gap feature to ensure alignment. Arrows 370 indicate the axial direction of travel taken by each of the locking sleeves when actuated by respective release sleeves. Springs 326, 328, and 368 are also shown in relation to the locking sleeves and axle.

FIG. 11 shows the relationships between release sleeves 306, 308, and 342 and the various locking sleeves. Arrows 372 indicate the rotational directions taken by each release mechanism when actuated to unlock a hub portion. A lateral or axial distance D is indicated to illustrate that the length of the hub assembly is fixed. Locking and unlocking activities cause certain components to move along axle 234. However, the overall length D does not change.

As should be clear from the preceding description, carrier 200 may be described as selectively operable in at least two modes: (a) a locked mode, in which the teeth of a locking sleeve engage with the teeth of a hub portion to prevent rotation of the respective limb member with respect to axle 234, and (b) an unlocked mode, in which a release sleeve is rotated, the protrusions of the respective locking sleeve are urged in a lateral direction by the helical slot of the release sleeve, the locking sleeve is translated along the axle, and the teeth of the locking sleeve are disengaged from the teeth of the hub portion to allow rotational positioning of the limb member.

Said another way, each of the limb members may be described as selectively operable in (a) a locked mode, in which the respective set of locking portions are engaged with the proximal end of the limb member, and (b) an unlocked mode, in which the respective release mechanism is rotated, the set of locking portions are disengaged from the limb member, and the limb member is rotatably positionable relative to the axle member.

Figure 12:
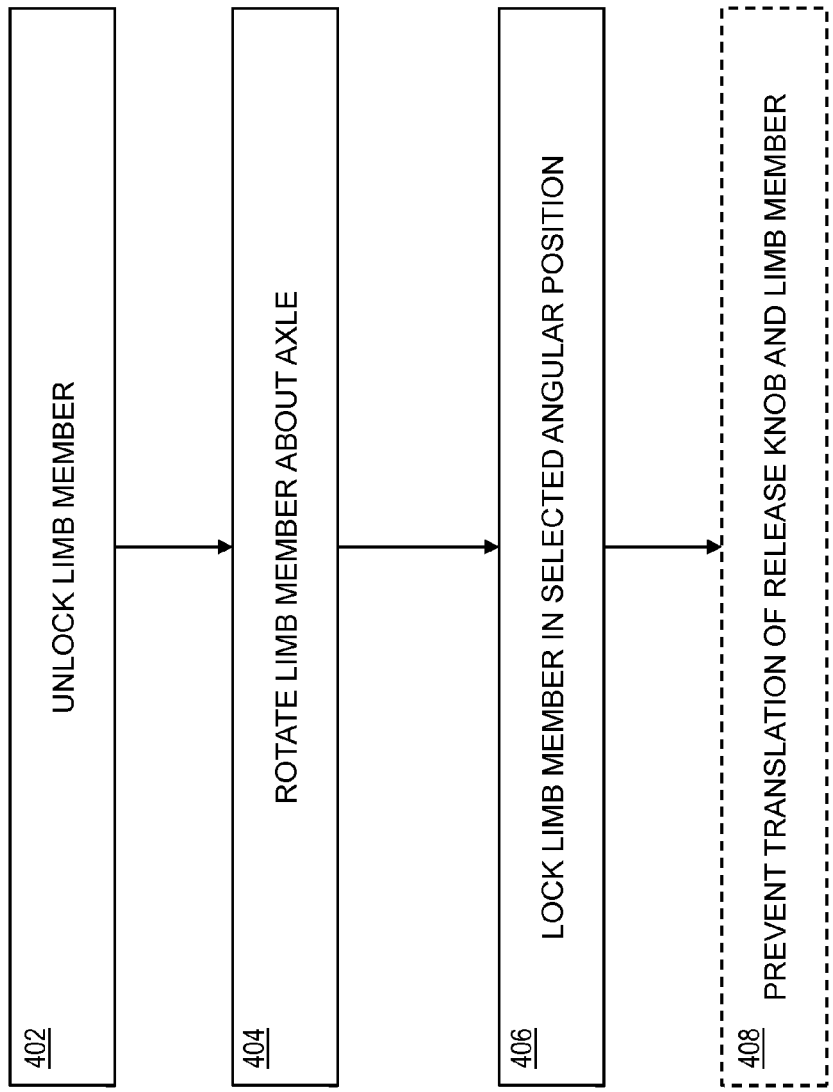
FIG. 12 is a flow chart showing various steps of an illustrative method for selectively adjusting portions of an adjustable bicycle carrier.

Method:

This section describes a method for adjusting a bicycle carrier; see FIG. 12. Aspects of the adjustable bicycle carriers described above may be utilized in the method steps described below. Where appropriate, reference may be made to previously described components and systems that may be used in carrying out each step. These references are for illustration, and are not intended to limit the possible ways of carrying out any particular step of the method.

FIG. 12 is a flowchart illustrating steps performed in an illustrative method, and may not recite the complete process or all steps of the method. FIG. 12 depicts multiple steps of a method, generally indicated at 400, which may be performed in conjunction with adjustable bicycle carriers of the present disclosure. Although various steps of method 400 are described below and depicted in FIG. 12, the steps need not necessarily all be performed, and in some cases may be performed in a different order than the order shown.

Step 402 may include unlocking a selectively rotatable limb member of a bicycle carrier from a fixed central axle. The limb member may include a support arm and/or a foot member. This step may be accomplished by rotating a release knob about the fixed central axle to force a corresponding locking sleeve to translate along the fixed central axle, thereby disengaging the locking sleeve from the limb member.

In some examples, the release knob may include a sleeve portion rotatably connected around the central axle. The sleeve portion may include a helical member that interfaces with a follower member on the locking sleeve to convert rotation of the release knob into translation of the locking sleeve. The helical member may include a helical slot and the follower member may include a pin.

In some examples, the central axle may span a frame of the bicycle carrier and may be fixed relative to the frame. The frame may form a continuous, closed perimeter.

In some examples, the release knob may be disposed on a circumferential surface between opposing ends of the axle. In some examples, the release knob may be adjacent the support arm.

Step 404 may include rotating the limb member about the fixed central axle to a selected angular position while maintaining the position of the release knob.

Step 406 may include locking the first support arm in the selected angular position by rotating the release knob to cause the locking sleeve to reengage with the first support arm. The locking sleeve may be keyed to the fixed central axle, such that the locking sleeve is prevented from rotating. In some examples, step 406 may include axially moving a first plurality of teeth of the locking sleeve into mating engagement with a corresponding second plurality of teeth of the support arm.

In method 400, unlocking the limb member may include rotating the release knob in one direction, and locking the limb member may include rotating the release knob in an opposite direction. In some examples, the release knob may be biased such that locking the limb member includes allowing a spring to urge the release knob in the opposite direction.

In some examples, method 400 may further include step 408, in which the release knob and the limb member may be prevented from translating along the central axle. Preventing the release knob and the limb member from translating along the central axle may include laterally abutting the release knob against a mechanical stop.

Selected Embodiments:

This section describes additional aspects and features of adjustable bicycle carriers and related methods, presented without limitation as a series of paragraphs, some or all of which may be alphanumerically designated for clarity and efficiency. Each of these paragraphs can be combined with one or more other paragraphs, and/or with disclosure from elsewhere in this application, including the materials incorporated by reference in the Cross-References, in any suitable manner. Some of the paragraphs below expressly refer to and further limit other paragraphs, providing without limitation examples of some of the suitable combinations.

A0. A method for adjusting a bicycle carrier, the method comprising:

unlocking a selectively rotatable limb member of a bicycle carrier from a fixed central axle by rotating a release knob about the fixed central axle to force a corresponding locking sleeve to translate along the fixed central axle, thereby disengaging the locking sleeve from the support arm;

rotating the limb member about the fixed central axle to a selected angular position while maintaining the position of the release knob; and locking the limb member in the selected angular position by rotating the release knob to cause the locking sleeve to reengage with the limb member;

wherein the locking sleeve is keyed to the fixed central axle, such that the locking sleeve is prevented from rotating.

A1. The method of claim A0, wherein the release knob comprises a sleeve portion rotatably connected around the central axle, the sleeve portion including a helical member that interfaces with a follower member on the locking sleeve to convert rotation of the release knob into translation of the locking sleeve.

A2. The method of claim A1, wherein the helical member comprises a helical slot and the follower member comprises a pin.

A3. The method of claim A0, wherein unlocking the limb member includes rotating the release knob in one direction, and locking the limb member includes rotating the release knob in an opposite direction.

A4. The method of claim A3, wherein the release knob is biased such that locking the support arm includes allowing a spring to urge the release knob in the opposite direction.

A5. The method of claim A0, wherein the central axle spans a frame of the bicycle carrier and is fixed relative to the frame.

A6. The method of claim A5, wherein the frame forms a continuous closed perimeter that stays in a fixed orientation between collapsed and use positions.

A7. The method of claim A0, wherein locking the limb member includes axially moving a first plurality of teeth of the locking sleeve into mating engagement with a corresponding second plurality of teeth of the support arm.

A8. The method of claim A0, wherein the release knob is disposed on a circumferential surface between opposing ends of the axle.

A9. The method of claim A8, wherein the release knob is adjacent the limb member.

A10. The method of claim A0, further comprising preventing the release knob and the support arm from translating along the central axle.

A11. The method of claim A10, wherein preventing the release knob and the support arm from translating along the central axle includes laterally abutting the release knob against a mechanical stop.

B0. An adjustable bicycle carrier comprising:
a continuous frame including a pair of opposing lateral portions, an upper portion, and a lower portion, such that the frame forms a closed perimeter, the lower portion of the frame configured to abut a supporting vehicle;
an elongate hub assembly spanning the frame and spaced from the upper portion of the frame, the hub assembly including an axle affixed to the opposing lateral portions of the frame, the frame maintaining a fixed orientation relative to the hub assembly between a collapsed position and an in-use position of the carrier;
a foot portion adjustably coupled to the hub assembly at a foot connection region, the foot portion configured to abut the vehicle at a location spaced from the lower portion of the frame; and
a pair of equipment support arms adjustably coupled to the hub assembly at positions straddling the foot connection region;
wherein the foot portion and the pair of equipment support arms are selectively rotatable around the axle of the hub assembly.

B1. The adjustable bicycle carrier of claim B0, wherein the frame is generally polygonal.

B2. The adjustable bicycle carrier of claim B0, wherein the hub assembly includes a support arm locking mechanism having a manual release knob disposed on the hub assembly between the opposing lateral portions of the frame.

B3. The adjustable bicycle carrier of claim B0, further including a vehicle engagement strap attached at one end to the frame above the hub assembly.

B4. The adjustable bicycle carrier of claim B3, wherein the vehicle engagement strap is attached at one end to the upper portion of the frame.

C0. An adjustable bicycle carrier comprising:
a frame having a pair of opposing lateral frame portions;
a hub assembly including an axle member having opposing ends respectively affixed to the opposing lateral frame portions;
a release sleeve rotatably connected around the axle member, the release sleeve including a knob portion and an actuating portion having a helical slot formed therein;
a locking sleeve keyed to the axle member such that the locking sleeve is translatable along a length of the axle member, the locking sleeve having an outer surface including a plurality of circumferentially disposed first teeth and a protrusion configured to interface with the helical slot of the release sleeve; and
a limb member having a proximal hub portion rotatably connected around the axle member and a distal portion protruding from the hub assembly, the hub portion having an inner surface including a plurality of second teeth;
wherein the bicycle carrier is selectively operable in a locked mode, in which the first teeth engage with the second teeth to prevent rotation of the limb member with respect to the axle member, and an unlocked mode, in which the release sleeve is rotated, the protrusion of the locking sleeve is urged in a lateral direction by the helical slot, the locking sleeve is translated along the axle member, and the first teeth are disengaged from the second teeth to allow rotational positioning of the limb member.

C1. The adjustable bicycle carrier of claim C0, wherein the locking sleeve and axle member are splined together.

C2. The adjustable bicycle carrier of claim C1, wherein a spline pattern of the axle member includes a gap indicating a desired positioning of the locking sleeve.

C3. The adjustable bicycle carrier of claim C0, wherein the frame forms a continuous, closed outer perimeter configuration which remains in a fixed orientation between collapsed and used positions.

C4. The adjustable bicycle carrier of claim C3, wherein the frame has a generally four-sided shape.

C5. The adjustable bicycle carrier of claim C0, wherein the limb member comprises an elongate equipment support member.

D0. An adjustable bicycle carrier comprising:
a frame having a continuous, closed outer perimeter, the configuration of the frame being the same in a collapsed position and a use position of the carrier;
a hub assembly spanning the frame, the hub assembly including an axle member attached at each end to the frame by a fixed connection;
a plurality of limb members, each limb member having a proximal end rotatably connected to the axle member of the hub assembly;
a plurality of release mechanisms, one for each of the limb members, each of the release mechanisms having a manual interface rotatable about a long axis of the axle member and an associated set of locking portions movable by the release mechanism in a direction parallel to the long axis of the axle member;
wherein each of the limb members is selectively operable in
(a) a locked mode, in which the respective set of locking portions are engaged with the proximal end of the limb member, and
(b) an unlocked mode, in which the respective release mechanism is rotated, the set of locking portions are disengaged from the limb member, and the limb member is rotatably positionable relative to the axle member.

D1. The adjustable bicycle carrier of claim D0, wherein each set of locking portions comprises a plurality of first teeth configured to engage corresponding second teeth on the proximal end of the respective limb member.

D2. The adjustable bicycle carrier of claim D0, wherein the limb members comprise a pair of spaced apart, elongate equipment support members.

D3. The adjustable bicycle carrier of claim D0, wherein each of the release mechanisms is biased toward the locked mode.

D4. The adjustable bicycle carrier of claim D3, wherein each of the release mechanisms is biased by a spring.

D5. The adjustable bicycle carrier of claim D4, wherein each spring is coaxial with the axle member.

E0. An adjustable bicycle carrier comprising:
a frame having a pair of opposing lateral frame portions, the frame configured to abuttingly engage a supporting vehicle and to remain in a single fixed orientation in both a collapsed position and a use position;
a hub assembly affixed to the frame, such that an axle member of the hub assembly is connected at each end to a respective one of the lateral frame portions, defining a fixed distance between the lateral frame portions;
a foot member having a hub end rotatably connected to the axle member, the foot member configured to abuttingly engage the supporting vehicle at a location spaced from the frame; and
a foot member release knob rotatably connected to the axle member adjacent the hub end of the foot member, the foot member release knob being interconnected with a locking sleeve having one or more lock portions configured to selectively interlock with the hub end of the foot member;
wherein rotation of the foot member release knob is configured to disengage the one or more lock portions from the hub end of the foot member; and
wherein the hub end of the foot member and the foot member release knob are each restricted from axial movement by adjacent portions of the hub assembly.

E1. The adjustable bicycle carrier of claim E0, wherein the one or more lock portions of the locking sleeve are mechanically confined to axial movement.

E2. The adjustable bicycle carrier of claim E1, wherein the one or more lock portions of the locking sleeve comprise a plurality of first teeth configured to engage corresponding second teeth on an interior portion of the hub end of the foot member.

E3. The adjustable bicycle carrier of claim E0, wherein the interconnection between the release knob and the locking sleeve comprises a helical slot and a corresponding pin configured to follow the helical slot.

E4. The adjustable bicycle carrier of claim E0, wherein the one or more lock portions are biased toward an interlocked position with the hub portion of the foot member.

E5. The adjustable bicycle carrier of claim E4, wherein the one or more lock portions are biased by a compression spring.

Advantages, Features, Benefits

The different embodiments of the adjustable bicycle carrier described herein provide several advantages over known solutions. For example, the illustrative embodiments described herein allow easier and more efficient support arm adjustments, as fewer hand motions and hand position changes are required from the user.

Additionally, and among other benefits, illustrative embodiments described herein provide a foot member locking mechanism that is securely positive and does not allow slippage of frame angle.

Additionally, and among other benefits, illustrative embodiments described herein provide high anchor points for top vehicle engagement straps. In other words, two vehicle engagement straps are mounted at the top corners of the frame, well above the axis of rotation of the support arms and foot member. This allows for easier fitting to a wider range of vehicles.

No known system or device can perform these functions, particularly on a rear trunk-mounted carrier. However, not all embodiments described herein provide the same advantages or the same degree of advantage.

CONCLUSION

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the invention(s) includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. An adjustable bicycle carrier comprising:
a frame having a continuous, closed outer perimeter, the configuration of the frame being the same in a collapsed position and a use position of the carrier;
a hub assembly spanning the frame, the hub assembly including an axle member attached at each end to the frame by a fixed connection;
a plurality of limb members, each limb member having a proximal end rotatably connected to the axle member of the hub assembly;
a plurality of release mechanisms, one for each of the limb members, each of the release mechanisms having a manual interface rotatable about a long axis of the axle member and an associated set of locking portions movable by the release mechanism in a direction parallel to the long axis of the axle member;
wherein each of the limb members is selectively operable in
(a) a locked mode, in which the respective set of locking portions are engaged with the proximal end of the limb member, and
(b) an unlocked mode, in which the respective release mechanism is rotated, the set of locking portions are disengaged from the limb member, and the limb member is rotatably positionable relative to the axle member, wherein each of the release mechanisms is biased toward the locked mode.

2. The adjustable bicycle carrier of claim 1, wherein the limb members comprise a pair of spaced apart, elongate equipment support members.

3. The adjustable bicycle carrier of claim 1, wherein each of the release mechanisms is biased by a spring.

4. The adjustable bicycle carrier of claim 3, wherein each spring is coaxial with the axle member.

5. An adjustable bicycle carrier comprising:
a frame having a pair of opposing lateral frame portions;
a hub assembly including an axle member having opposing ends respectively affixed to the opposing lateral frame portions;
a release sleeve rotatably connected around the axle member, the release sleeve including a knob portion and an actuating portion having a helical slot formed therein;
a locking sleeve keyed to the axle member such that the locking sleeve is translatable along a length of the axle member, the locking sleeve having an outer surface including a plurality of circumferentially disposed first teeth and a protrusion configured to interface with the helical slot of the release sleeve; and
a limb member having a proximal hub portion rotatably connected around the axle member and a distal portion protruding from the hub assembly, the hub portion having an inner surface including a plurality of second teeth;
wherein the bicycle carrier is selectively operable in a locked mode, in which the first teeth engage with the second teeth to prevent rotation of the limb member with respect to the axle member, and an unlocked mode, in which the release sleeve is rotated, the protrusion of the locking sleeve is urged in a lateral direction by the helical slot, the locking sleeve is translated along the axle member, and the first teeth are disengaged from the second teeth to allow rotational positioning of the limb member.

6. The adjustable bicycle carrier of claim 5, wherein the locking sleeve and axle member are splined together.

7. The adjustable bicycle carrier of claim 6, wherein a spline pattern of the axle member includes a gap indicating a desired positioning of the locking sleeve.

8. The adjustable bicycle carrier of claim 5, wherein the frame forms a continuous, closed outer perimeter configuration which remains in a fixed orientation between collapsed and used positions.

9. The adjustable bicycle carrier of claim 8, wherein the frame has a generally four-sided shape.

10. The adjustable bicycle carrier of claim 5, wherein the limb member comprises an elongate equipment support member.

11. A method for adjusting a bicycle carrier, the method comprising:
unlocking a selectively rotatable limb member of a bicycle carrier from a fixed central axle by rotating a release knob about the fixed central axle to force a corresponding locking sleeve to translate along the fixed central axle, thereby disengaging the locking sleeve from a support arm;
rotating the limb member about the fixed central axle to a selected angular position while maintaining the position of the release knob; and
locking the limb member in the selected angular position by rotating the release knob to cause the locking sleeve to reengage with the limb member;
wherein the locking sleeve is keyed to the fixed central axle, such that the locking sleeve is prevented from rotating, wherein the release knob comprises a sleeve portion rotatably connected around the central axle, the sleeve portion including a helical member that interfaces with a follower member on the locking sleeve to convert rotation of the release knob into translation of the locking sleeve.

12. The method of claim 11, wherein the helical member comprises a helical slot and the follower member comprises a pin.

13. The method of claim 11, wherein unlocking the limb member includes rotating the release knob in one direction, and locking the limb member includes rotating the release knob in an opposite direction.

14. The method of claim 13, wherein the release knob is biased such that locking the support arm includes allowing a spring to urge the release knob in the opposite direction.

15. The method of claim 11, wherein the central axle spans a frame of the bicycle carrier and is fixed relative to the frame.

16. The method of claim 15, wherein the frame forms a continuous closed perimeter that stays in a fixed orientation between collapsed and use positions.

17. The method of claim 11, wherein locking the limb member includes axially moving a first plurality of teeth of the locking sleeve into mating engagement with a corresponding second plurality of teeth of the support arm.

* * * * *